Dec. 29, 1936.  H. G. BAUMAN  2,066,245
TUBE EVACUATOR AND SEVERING DEVICE
Filed Feb. 5, 1936
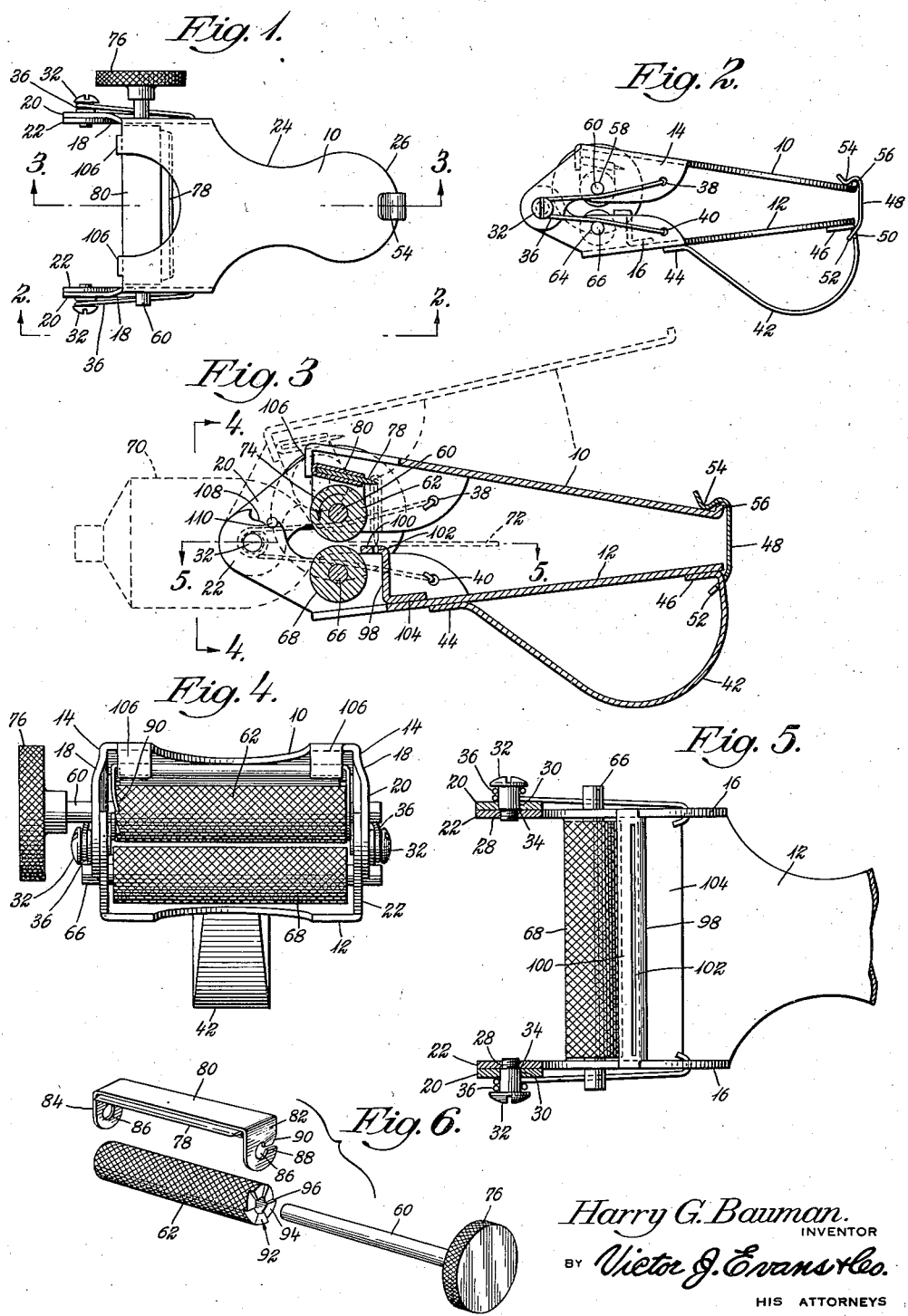
Harry G. Bauman,
INVENTOR
BY Victor J. Evans & Co.
HIS ATTORNEYS Patented Dec. 29, 1936

2,066,245

UNITED STATES PATENT OFFICE 2,066,245

TUBE EVACUATOR AND SEVERING DEVICE

Harry G. Bauman, Chicago, Ill.

Application February 5, 1936, Serial No. 62,515

15 Claims. (Cl. 221—60)

My invention relates to the extrusion of plastic materials from collapsible tubes, and has among its objects and advantages the provision of an improved extruder and severing device for the evacuated parts of the tubes.

In the accompanying drawing:

Fig. 1 is a top plan view of my invention;

Fig. 2 is a side view;

Fig. 3 is an enlarged sectional view along the line 3—3 of Fig. 1;

Fig. 4 is an end view taken from the position indicated by the line 4—4 of Fig. 3;

Fig. 5 is a sectional view along the line 5—5 of Fig. 3; and

Fig. 6 is a perspective view of the actuating roll and the tube severing mechanism with the parts separate for the sake of clearness.

In the embodiment selected to illustrate my invention, I make use of two plates 10 and 12, each having two flanges 14 and 16, respectively. The flanges 14 are offset at 18 (see Fig. 1) to position their ends 20 in overlapping relation with the ends 22 of the flanges 16. Each plate 10 and 12 is reduced at 24 and curved at 26 to provide a convenient grip.

In Fig. 5, each end 22 is provided with a threaded opening 28 arranged in alignment with a larger opening 30 in its associated end 20. A screw 32 has threaded relation with the opening 28 for holding the grouped ends in assembled relation. The screw 32 fits loosely in the opening 30 and includes a shoulder 34 bearing against the end 22. Each screw 32 projects beyond its associated end 20 for the support of the convolutions 36 of a spring wire, having one end passing through an opening 38 in the flange 14, and the other end passing through an opening 40 in the flange 16. The spring wires operate to move the plates 10 and 12 apart about the axes of the screws 32.

A grip 42 shaped in the nature of a loop has one end 44 welded to the plate 12 and its opposite end 46 welded to the same plate. I provide a latch 48 for holding the plates 10 and 12 in the position illustrated in Figs. 2 and 3. One end of the latch terminates in two fingers 52 which lie within recesses 50, and are bent partly around the grip 42 for connecting purposes. This connection permits pivotal movement of the latch. The other end of the latch is bent at 54 to provide a hook arranged to extend over a flange 56 formed integrally with the plate 10.

Each of the flanges 14 is provided with an opening 58 for rotatably supporting a shaft 60 upon which an actuating roll 62 is fixedly connected. Similarly, each of the flanges 16 is provided with an opening 64 for rotatably supporting a shaft 66 upon which a companion roll 68 is fixedly mounted. The roll 68 is arranged in operative relation with the roll 62 for squeezing a collapsible tube 70. The flattened end of the tube is indicated at 72.

Each roll 62 and 68 may be provided with a knurled surface for increasing the tractive action thereof. In operation, rotation of the roll 62 in the direction indicated by the arrow 74, of Fig. 3, through the medium of the grip 76 fixedly secured to the shaft 60, pulls the tube 70 inwardly. The tube is pinched tightly between the rolls 62 and 68 so as to extrude the material from the tube. The flattened sides of the tube 70 are pressed firmly together so as to evacuate all the material between the flattened sides. In placing the tube between the rolls 62 and 68, the latch 48 may be disconnected, at which time the plates 10 and 12 are separated. When the plates are shifted to the position of Fig. 3, firm pinching relation is established between the rolls 62 and 68.

Collapsible tubes are frequently difficult to collapse so as to thoroughly evacuate the contents. This is an important matter in connection with the use of costly materials, such as artists' coloring material. My device is also suitable for use in connection with conventional tubes containing toilet and medicinal preparations.

I provide means for cutting off the flattened end, whereby storage space is reduced as well as rendering the partly evacuated tubes more convenient for holding purposes. The cut-off mechanism comprises a blade 78 detachably secured within a holder 80 comprising sheet metal bent back upon itself to the shape of a U. The blade 78 may comprise a portion of a conventional razor blade. The holder 80 includes flanges 82 and 84 arranged at right angles to the holder, which flanges are provided with openings 86 for loosely receiving the shaft 60. The flange 82 is severed at 88 and a part of the flange is bent inwardly at 90 to provide a lip arranged in operative relation with the notched end 92 of the roll 62.

These notches include angular surfaces 94 and abutments 96. The relation between the lip 90 and the notched end 92 is such that the roll 62 may be rotated in the direction of the arrow 74 independently of the flanges 82 and 84, but rotation of the roll in the opposite direction brings the end of the lip 90 into abutting relation with one of the abutments 96, whereby the holder 80 may be shifted to the dotted line position of Fig. 3 for severing the flattened end 72. The plate 12 carries a flange 98 having a second flange 100 positioned underneath the flattened end 72. The flange 100 is provided with a slot 102 for the reception of the blade 78 as the blade passes through the tube. I provide the flange 98 with a third flange 104 which may be welded to the plate 12.

Rotation of the roll 62 in the direction of the arrow 74 moves the holder 80 to the full line position of Fig. 3. In this position, the holder 80 engages two lips 106 which comprise material of the plate 10 bent downwardly. The roll 62 may be turned easily after the holder 80 has been moved to the full line position of Fig. 3, since the lip 90 is of a flexible nature and does not offer much resistance.

My construction, in addition to providing effective extrusion for collapsible tubes, provides a compact and convenient extruding and severing mechanism because of the peculiar relation between the severing device and the roll 62. The blade is located within the contour of the plates 10 and 12 which affords protection to the user. Access to the blade 78 for placement or substitution purposes is easily attained by releasing the latch 48.

In Fig. 3, one of the ends 22 is provided with a depression 108 for the reception of a pin 110 carried by the companion end 20. When the latch 48 is released, the spring means urges the plates 10 and 12 apart, but the depression 108 and the pin 110 limit the separating movement of the plates.

The spacing between the plates 10 and 12 in their latched relation determines the spacing between the pinch rolls 62 and 68. Precise spacing between the pinch rolls for tube walls of different thicknesses may be attained by bending the hook 54. Because of the close relation between the pinch rolls and the screws 32, separating forces at the latched end of the plates are materially reduced, which permits the use of bendable material for the latch.

Partly evacuated tubes removed from the extruder may be folded once at the flattened end to prevent opening of the tube. In most cases this is unnecessary since the walls of the flattened end will remain closed.

My invention may be used without the aid of the latch 48. With the latch in an inoperative position, the device may be held in the left hand, with the second or middle finger inserted in the grip or loop 42, at which time the index finger may be used to support the tube in front of the rolls 62 and 68, while the thumb is placed on the plate 10 directly above the middle finger. When the thumb is raised a tube may be inserted between the rolls and any pressure desired may be applied by the operator. Thus, it will be seen that when the thumb is raised, the tube may be instantly detached and another quickly substituted.

My spring feature operates to separate the rolls when pressure is removed from the plates 10 and 12. Because of the firm manner in which the device may be held, and with the other hand free to operate the knob 76, an effective and easy control is attained. An efficient leverage is attained because of the position of the hinge represented by the screws 32 with respect to the rolls. The length of the plates 10 and 12 provides ample leverage for applying any desired amount of power without the aid of additional devices such as springs.

My latch 48 may be employed for suspending the device from a supporting pin. Thus, a tube of shaving cream or tooth paste positioned between the rolls is firmly retained therebetween when the latch is adjusted according to Fig. 2.

Without further elaboration, the foregoing will so fully explain my invention that others may, by applying current knowledge, readily adapt the same for use under various conditions of service.

I claim:

1. A device of the type described, comprising a pair of pinch rolls spaced for flattening a collapsible tube, means for rotatably mounting the rolls, said means comprising a pair of hingedly connected members arranged to be separated for separating the rolls, a severing device for the flattened part of the tube, and an operating connection between one of the pinch rolls and the cutter so constructed and arranged as to be moved into cutting relation with the flattened part of the tube when the said one pinch roll is rotated in one direction, but shiftable to an inoperative position upon rotation of the said one pinch roll in the other direction.

2. In an extruding device for collapsible tubes, a pair of pinch rolls spaced for flattening a tube passing therebetween, manually operable means connected with one of said pinch rolls for drawing the tube between the pinch rolls, a severing device for the flattened part of the tube, and an operating connection between the severing device and the said one pinch roll, said operating connection being so constructed as to move the severing device into cutting relation with the flattened part of the tube upon rotation of the said one pinch roll in one direction, but operating to shift the severing device in an inoperative position when the said one pinch roll is rotated in the other direction.

3. In an extruding device for collapsible tubes, a pair of pinch rolls spaced for flattening a tube passing therebetween, manually operable means connected with one of said pinch rolls for drawing the tube between the pinch rolls, a severing device for the flattened part of the tube, and an operating connection between the severing device and the said one pinch roll, said operating connection being so constructed as to move the severing device into cutting relation with the flattened part of the tube upon rotation of the said one pinch roll in one direction, but operating to shift the severing device in an inoperative position when the said one pinch roll is rotated in the other direction, said operating connection being so devised as to permit continued rotation of the said one pinch roll in said other direction after the cutter has been shifted to the inoperative position.

4. A device of the type described comprising two supporting members hingedly connected together, including spring means operatively connected therewith for urging the members apart about the axis of the hinged connection, latch means for holding the members in operative relation, a pinch roll rotatably carried by each of the supporting members and spaced for flattening a collapsible tube, to extrude its contents, a severing device for the flattened part of the tube, an operating connection between the severing device and one of said pinch rolls, manually operable means connected with the said one pinch roll for rotating the same, said operating connection being so constructed and arranged as to move the severing device to an inoperative position when the said one roll is rotated in the extruding direction, but operating to move the severing device into cutting relation with the flattened part of the tube when the said one pinch roll is rotated in the opposite direction, and means carried by one of said supporting members for limiting the movement of the severing device in the inoperative direction, said operating connection permitting continued rotation of the said one pinch roll independently of the severing device after the latter has been moved to its inoperative position.

5. A device of the type described comprising two supporting members hingedly connected together, including spring means operatively connected therewith for urging the members apart about the axis of the hinged connection, latch means for holding the members in operative relation, a pinch roll rotatably carried by each of the supporting members and spaced for flattening a collapsible tube, to extrude its contents, a severing device for the flattened part of the tube, an operating connection between the severing device and one of said pinch rolls, manually operable means connected with the said one pinch roll for rotating the same, said operating connection being so constructed and arranged as to move the severing device to an inoperative position when the said one roll is rotated in the extruding direction, but operating to move the severing device into cutting relation with the flattened part of the tube when the said one pinch roll is rotated in the opposite direction, means carried by one of said supporting members for limiting the movement of the severing device in the inoperative direction, said operating connection permitting continued rotation of the said one pinch roll independently of the severing device after the latter has been moved to its inoperative position, and a support for the flattened part of the tube projecting from the pinch rolls, said support including a slot for the reception of the severing device as it passes through the tube.

6. An extruder comprising two supporting members each provided with a pair of flanges arranged in parallel relation, the flanges of one member being arranged in overlapping relation with the flanges of the other member, means for hingedly connecting the overlapping flanges, a pinch roll carried by each pair of flanges and rotatably mounted thereon, said pinch rolls being spaced for flattening a collapsible container for advancing the same therebetween, manually operable means connected with one of the pinch rolls for rotating the same, a cutting blade and a holder therefor, said holder being movably connected with the said one pinch roll, the movable connection being so devised as to shift the blade and its holder to an inoperative position when the said one pinch roll is rotated in the tube advancing direction, but operating to move the holder and the blade into cutting relation with the flattened tube when the said one pinch roll is rotated in the opposite direction, spring means connected with one flange of each pair of flanges for urging the supporting members apart, and latch means for holding the members in operative relation against the tension of said spring means.

7. An extruder comprising two supporting members each provided with a pair of flanges arranged in parallel relation, the flanges of one member being arranged in overlapping relation with the flanges of the other member, means for hingedly connecting the overlapping flanges, a pinch roll carried by each pair of flanges and rotatably mounted thereon, said pinch rolls being spaced for flattening a collapsible container for advancing the same therebetween, manually operable means connected with one of the pinch rolls for rotating the same, a cutting blade and a holder therefor, said holder being movably connected with the said one pinch roll, the movable connection being so devised as to shift the blade and its holder to an inoperative position when the said one pinch roll is rotated in the tube advancing direction, but operating to move the holder and the blade into cutting relation with the flattened tube when the said one pinch roll is rotated in the opposite direction, spring means connected with one flange of each pair of flanges for urging the supporting members apart, latch means for holding the members in operative relation against the tension of said spring means, and a supporting member for the flattened part of the tube, said supporting member being provided with an opening for the reception of said blade as it passes through the flattened part of the tube.

8. In a device of the type described, a pair of pinch rolls spaced for squeezing a collapsible container, a support for each pinch roll including openings, a shaft carried by each pinch roll and rotatably positioned in the openings associated with its respective support, and a tube severing device having a pair of flanges provided with openings for loosely receiving the shaft associated with one of said pinch rolls, one end of the said one pinch roll being provided with an abutment, one of said flanges including a resilient lip arranged in operative relation with said abutment, said lip engaging the abutment for moving the severing device into cutting relation with the collapsed part of the tube when the said one pinch roll is rotated in one direction, but operating to shift the severing device to an inoperative position when the said one pinch roll is rotated in the opposite direction, said lip and said abutment being so arranged as to permit continued rotation of the said one pinch roll independently of the severing device after the latter has been moved to its inoperative position.

9. In an extruding device for collapsible tubes, a pair of pinch rolls spaced for flattening the tube, to extrude its contents, a severing device for the flattened part of the tube, said severing device having a ratchet connection with one of the pinch rolls for moving the severing device into cutting relation with the flattened part of the tube when the said one pinch roll is rotated in one direction, but operating to move the severing device to an inoperative position when the said one pinch roll is rotated in the opposite direction, and means for rotating the said one pinch roll.

10. In an extruding device for collapsible tubes, a pair of pinch rolls spaced for flattening the tube, to extrude its contents, a severing device for the flattened part of the tube, said severing device having a ratchet connection with one of the pinch rolls for moving the severing device into cutting relation with the flattened part of the tube when the said one pinch roll is rotated in one direction, but operating to move the severing device to an inoperative position when the said one pinch roll is rotated in the opposite direction, and means for rotating the said one pinch roll, said severing device including a blade and a holder for detachably mounting the blade.

11. In an extruding device for collapsible tubes, a pair of pinch rolls spaced for flattening the tube, to extrude its contents, a severing device for the flattened part of the tube, said severing device having a ratchet connection with one of the pinch rolls for moving the severing device into cutting relation with the flattened part of the tube when the said one pinch roll is rotated in one direction, but operating to move the severing device to an inoperative position when the said one pinch roll is rotated in the opposite direction, and means for rotating the said one pinch roll, said severing device comprising a razor blade and a pair of pinch elements for detachably holding the blade.

12. In a device of the type described, a pair of rotatable elements spaced for flattening a collapsible tube, to extrude its contents, means for turning one of the rotating members for advancing the tube between the members, a severing device for the flattened part of the tube, an operating connection between the severing device and the said one rotatable member for moving the severing device into cutting relation with the flattened part of the tube when the rotatable member is turned in the tube advancing direction, but operating to move the severing device out of impeding relation with the severed end of the tube when the said one rotatable member is rotated in the opposite direction.

13. In a device of the type described, a pair of pinch rolls spaced for flattening a collapsible tube, to extrude its contents, grip means for turning one of the pinch rolls for advancing the tube between the rolls, a severing device for the flattened part of the tube, operating connections between the severing device and the said one pinch roll for moving the severing device into cutting relation with the flattened part of the tube, but operating to move the severing device out of impeding relation with the severed end of the tube when the said one pinch roll is rotated in the opposite direction.

14. In a device of the type described, a pair of rotatable elements spaced for flattening a collapsible tube, to extrude its contents, means for turning one of the rotating members for advancing the tube between the members, a severing device for the flattened part of the tube, a ratchet connection between the severing device and the said one rotatable member for moving the severing device into cutting relation with the flattened part of the tube when the rotatable member is rotated in one direction, but operating to move the severing device out of impeding relation with the severed end of the tube when the said rotatable member is rotated in the opposite direction, and means for limiting the movement of the severing device in both directions.

15. In a device of the type described, a pair of rotatable elements spaced for flattening a collapsible tube, to extrude the contents, means for turning one of the rotatable elements for advancing the tube between the two elements, a severing device for the flattened part of the tube, an operating connection between the severing device and one of said rotatable elements for moving the severing device into cutting relation with the flattened part of the tube when the rotatable element is turned in the tube advancing direction, but operating to move the severing device out of impeding relation with the severed end of the tube when the rotatable elements are rotated in the opposite direction.

HARRY G. BAUMAN.